June 5, 1956  C. F. CALLIS  2,749,215
PROCESS FOR MANUFACTURE OF SODIUM POLYPHOSPHATES
Filed March 18, 1953  2 Sheets—Sheet 1
FIG. I
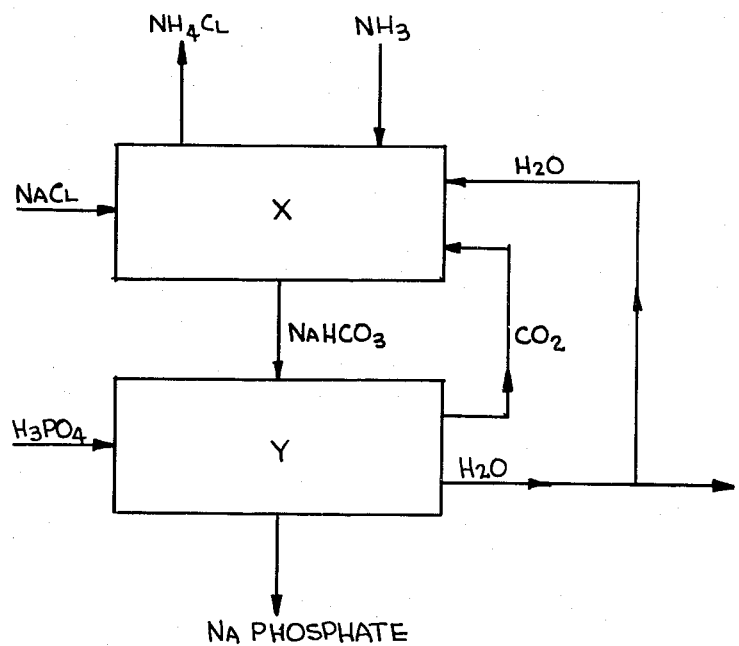
CLAYTON F. CALLIS,
*INVENTOR.*
BY
HIS AGENT

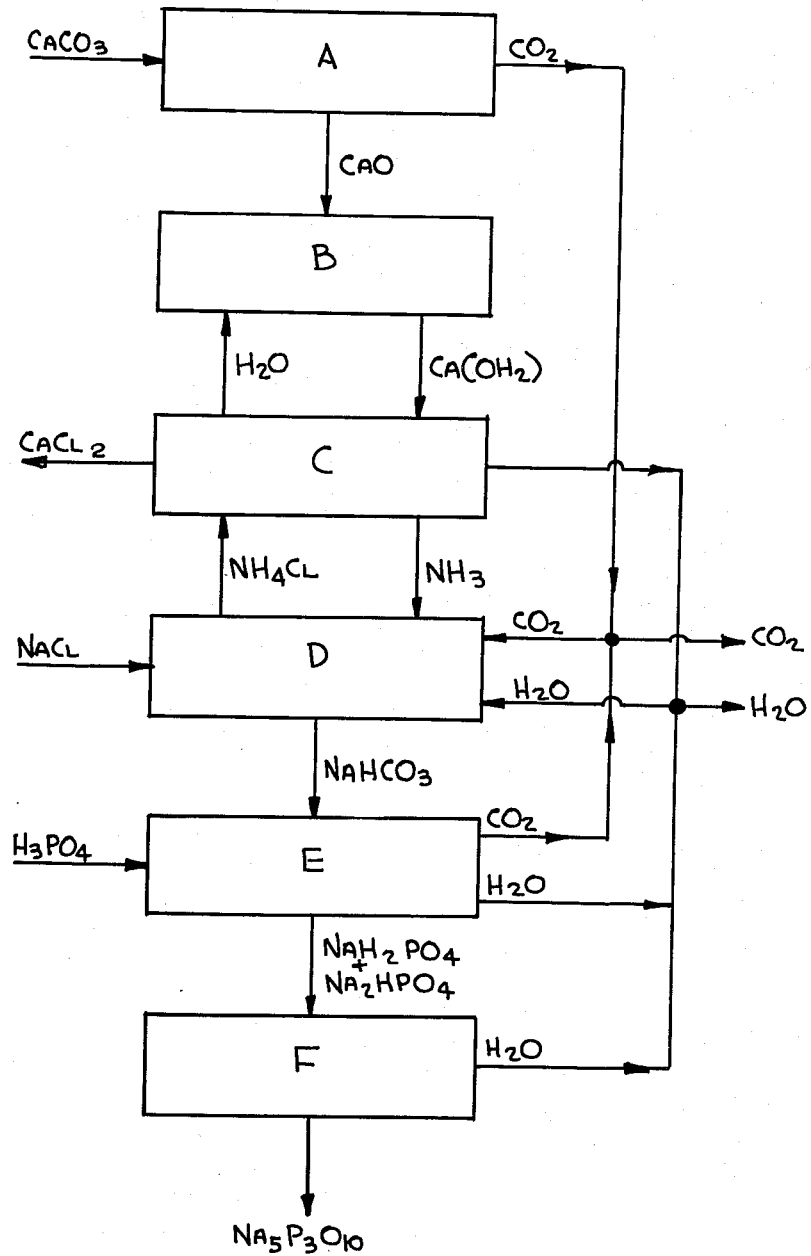

United States Patent Office 2,749,215
Patented June 5, 1956

2,749,215

PROCESS FOR MANUFACTURE OF SODIUM POLYPHOSPHATES

Clayton F. Callis, Dayton, Ohio, assignor to Monsanto Chemical Company, St. Louis, Mo., a corporation of Delaware Application March 18, 1953, Serial No. 343,085

2 Claims. (Cl. 23—107)

This invention relates to the production of inorganic phosphates, and more particularly, it relates to the production of sodium phosphates such as, for example, sodium tripolyphosphate, tetrasodium pyrophosphate, disodium pyrophosphate, sodium metaphosphate, monosodium orthophosphate, disodium orthophosphate, trisodium orthophosphate, etc.

For many years attempts have been made to develop a commercial method for the manufacture of various sodium phosphate salts from sodium chloride and phosphoric acid or phosphorus pentoxide. While many such processes have been proposed, none have been successful—either because of poor yields or impure products, or because of technical difficulties in the commercial application of the processes. It is an object of the present invention to provide a simple, efficient, and economical method for making sodium phosphate salts from sodium chloride and phosphoric acid.

It has now been found that the foregoing object can be achieved by a process utilizing, in addition to sodium chloride and phosphoric acid, a material designated herein as a "chlorine collector."

Examples of processes which can be carried out according to the present invention are those indicated by the equations listed immediately below. It should be understood, however, that these equations indicate only the overall result of the process in terms of raw materials and products, and are not intended to imply that such reactions can actually be carried out as a single step.

$5NaCl + 3H_3PO_4 + 5NH_3 \rightarrow 5NH_4Cl + Na_5P_3O_{10} + 2H_2O$
$4NaCl + 2H_3PO_4 + 2CaO \rightarrow Na_4P_2O_7 + 2CaCl_2 + 3H_2O$
$2NaCl + H_3PO_4 + Ca(OH)_2 \rightarrow Na_2HPO_4 + CaCl_2 + 2H_2O$
$2NaCl + 2H_3PO_4 + CaCO_3 \rightarrow$
$\qquad 2NaPO_3 + CaCl_2 + 3H_2O + CO_2$
$4NaCl + 2H_3PO_4 + 4NH_3 \rightarrow Na_4P_2O_7 + 4NH_4Cl + H_2O$
$10NaCl + 6H_3PO_4 + 5CaCO_3 \rightarrow$
$\qquad 2Na_4P_3O_{10} + 5CaCl_2 + 9H_2O + 5CO_2$ In the foregoing equations it will be noted that the chlorine collectors, the use of which is absolutely necessary to the practice of the present invention, are readily available and inexpensive materials such as limestone, lime, calcium hydroxide, ammonia and the like.

In its simplest form the present invention is accomplished by a series of steps involving, first, a reaction with sodium chloride, ammonia and carbon dioxide in aqueous solution under conditions suitable for the formation of sodium bicarbonate and ammonium chloride and, second a reaction between sodium bicarbonate and phosphoric acid under conditions suitable for the formation of sodium phosphate salts, carbon dioxide and water. The carbon dioxide and water released during the second reaction can be advantageously utilized in the first reaction. This aspect of the invention is illustrated by the flowsheet of Figure I.

In a preferred embodiment of the invention the ammonium chloride from the first of the above reactions is treated with calcium hydroxide to form calcium chloride with the release of water and ammonia, either or both of which latter materials are then reutilized as reactants for the first reaction.

A further preferred embodiment of the invention involves the use of water (which may be recovered from the above-described reaction of calcium hydroxide and ammonium chloride) and lime to form the calcium hydroxide for use as mentioned in the preceding paragraph.

A further preferred embodiment of the present invention involves the calcination of limestone to supply the lime for the formation of calcium hydroxide, the calcination also yielding carbon dioxide which can be utilized in the above-mentioned reaction of sodium chloride, ammonia, carbon dioxide, and water (for the formation of sodium bicarbonate and ammonium chloride).

A specific preferred embodiment of the present invention is illustrated by the flowsheet of Figure II, which indicates in a general way the relationships between the various reactions which can be carried out according to the present invention. Referring to Figure II, limestone is calcined at A to yield lime and carbon dioxide according to the reaction:

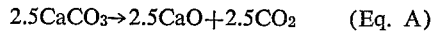
$\qquad 2.5CaCO_3 \rightarrow 2.5CaO + 2.5CO_2 \qquad$ (Eq. A)

The lime is removed from A and allowed to react with water to form calcium hydroxide at B according to the following reaction:

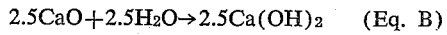
$\qquad 2.5CaO + 2.5H_2O \rightarrow 2.5Ca(OH)_2 \qquad$ (Eq. B)

At C calcium hydroxide and ammonium chloride react to yield calcium chloride, ammonia and water. The following equations may be used to represent the reaction taking place at C:

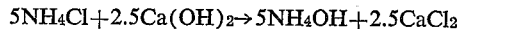
$5NH_4Cl + 2.5Ca(OH)_2 \rightarrow 5NH_4OH + 2.5CaCl_2$
$\qquad\qquad\qquad\qquad\qquad\qquad\qquad\qquad$ (Eq. $C_1$)
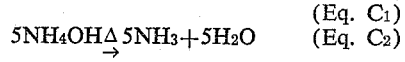
$\qquad 5NH_4OH \xrightarrow{\Delta} 5NH_3 + 5H_2O \qquad$ (Eq. $C_2$)

Part of the water released at C is returned to B for the formation of calcium hydroxide from the lime, while the remainder of the water and the ammonia are utilized in the reaction at D.

At D sodium chloride, ammonia, carbon dioxide and water react under conditions suitable for the formation of ammonium chloride and sodium bicarbonate. The reactions taking place at D may be represented as follows:

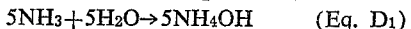
$\qquad 5NH_3 + 5H_2O \rightarrow 5NH_4OH \qquad$ (Eq. $D_1$)
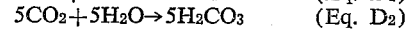
$\qquad 5CO_2 + 5H_2O \rightarrow 5H_2CO_3 \qquad$ (Eq. $D_2$)
$5NH_4OH + 5H_2CO_3 \rightarrow 5NH_4HCO_3 + 5H_2O$
$\qquad\qquad\qquad\qquad\qquad\qquad\qquad\qquad$ (Eq. $D_3$)
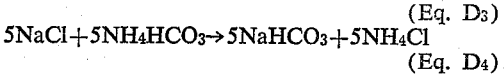
$5NaCl + 5NH_4HCO_3 \rightarrow 5NaHCO_3 + 5NH_4Cl$
$\qquad\qquad\qquad\qquad\qquad\qquad\qquad\qquad$ (Eq. $D_4$)

The ammonium chloride formed at D is returned to C for the release and recovery of ammonia to be reutilized in the reactions at D.

The above reactions $D_1$, $D_2$, $D_3$, and $D_4$ are the same as are carried out in the "carbonating" and "making" towers of the Solvay process for making soda ash, and are carried out in substantially the same manner. The details of operation of this series of reactions are, of course, well-known to those skilled in the art of industrial and inorganic chemistry and technology. The same careful control of conditions of temperature, pressures, and concentrations which is required in the Solvay process is also required in the present invention in order to obtain optimum results.

The sodium bicarbonate formed at D is allowed to react with phosphoric acid at E under conditions suitable for the formation of a mixture of monosodium orthophosphate and disodium orthophosphate according to the following reaction:

$5NaHCO_3 + 3H_3PO_4 \rightarrow$
$\qquad 2Na_2HPO_4 + NaH_2PO_4 + 5H_2O + 5CO_2$ (Eq. E)

The carbon dioxide and water released during the reaction at E are returned to the process at D, whereas the mixture of mono- and disodium phosphates is dried and dehydrated at elevated temperatures to form sodium tripolyphosphate according to the reaction:

$$2Na_2HPO_4 + NaH_2PO_4 \rightarrow Na_5P_3O_{10} + 2H_2O$$
(Eq. F)

The water released during this dehydration is returned to the process at D.

It will be noted that the summation of all of the above equations A through F, inclusive, is as follows:

$$3H_3PO_4 + 5NaCl + 2.5CaCO_3 \rightarrow$$
$$Na_5P_3O_{10} + 2.5CaCl_2 + 2.5CO_2 + 4.5H_2O$$

While the foregoing summation of reactions indicates that there is no net consumption of ammonia, in actual practice small amounts of ammonia will be required to make up for unavoidable losses which will occur throughout the process.

It should be understood that the above-discussed reactions and flow diagrams are intended to indicate only the materials which actually enter into the various reactions and the general pattern of flow of the various reactants and products. Thus, for example, the calcium hydroxide from reaction B, the calcium chloride from reaction C, the sodium chloride and phosphoric acid entering reactions D and E, and the ammonium chloride leaving reaction D will all be handled most conveniently as aqueous solutions or slurries. However, the water in such solutions or slurries is not indicated on the aforesaid flow diagrams. Likewise, the presence of separate lines on the flow diagrams does not indicate that the reactants or products need be separated. For example, the carbon dioxide and water from reaction E, or portions of the carbon dioxide, ammonia and water going into reaction D, can be very conveniently handled as gaseous mixtures or liquid solutions. These matters are factors which can be varied according to particular technological and economic considerations, and are well within the skill of competent process engineers.

As stated above, the present process can be utilized without the reactions represented at A, A and B, or A, B, and C of the flow diagram in Figure II, depending upon the availability of the various possible materials which can be used as "chlorine collectors," availability and cost of suitable equipment, and similar economic considerations.

The particular embodiment of the invention illustrated in Figure II and described in detail above is directed to the production of sodium tripolyphosphate. However, as suggested by Figure I, by appropriate variation of reaction conditions and drying or dehydrating conditions in reactions E and/or F (of Figure II) other sodium phosphates can be readily produced.

For example, sodium tripolyphosphate was produced by mixing the sodium bicarbonate and phosphoric acid in amounts such that disodium phosphate and monosodium phosphate were produced in a molar ratio of 2:1. These later phosphates (probably present as a mixture of $Na_2HPO_4$ and a double salt $Na_2HPO_4 \cdot NaH_2PO_4$) are then dried and dehydrated at elevated temperatures ranging from about 300 to about 600° C.

If it is desired to make tetrasodium pyrophosphate by the present process, then the phosphoric acid and sodium bicarbonate are mixed in proportions such that Na:P ratio is 2:1. This mixture can be calcined at elevated temperatures ranging from about 250 to about 950° C. to yield tetrasodium pyrophosphate according to the well-known reactions such as the following:

$$2Na_2HPO_4 \xrightarrow{\Delta} Na_4P_2O_7 + H_2O$$

$$2Na_2HPO_4 \cdot 2H_2O \xrightarrow{\Delta} Na_4P_2O_7 + 3H_2O$$

$$2Na_2HPO_4 \cdot 7H_2O \xrightarrow{\Delta} Na_4P_2O_7 + 8H_2O$$

Similarly, sodium metaphosphate can be produced by adjusting the ratio of phosphoric acid and sodium bicarbonate to produce substantially only $NaH_2PO_4$ or a hydrate thereof, such as $NaH_2PO_4 \cdot 2H_2O$, which can be calcined at elevated temperatures of from about 350 to about 625° C. or higher to form the metaphosphate as follows:

$$n(NaH_2PO_4) \xrightarrow{\Delta} (NaPO_3)_n + nH_2O$$

$$n(NaH_2PO_4 \cdot 2H_2O) \xrightarrow{\Delta} (NaPO_3)_n + 2nH_2O$$

The mono- and disodium orthophosphates are, of course, readily produced by merely drying the appropriately neutralized product from reaction of the phosphoric acid and sodium bicarbonate.

The process of the invention is also applicable to the production of trisodium phosphate, but because of the peculiarly high basicity of trisodium phosphate an extra step is required in the manufacture of this product. In such a case, the disodium orthophosphate from reaction of phosphoric acid and sodium bicarbonate must be further reacted with sodium hydroxide to form the trisodium phosphate according to the well-known reaction:

$$Na_2HPO_4 + NaOH \rightarrow Na_3PO_4 + H_2O$$

It is obvious, of course, that the present invention is equally useful for producing more than one of the sodium phosphate salts at a time by splitting the sodium bicarbonate stream and neutralizing various portions thereof with different proportions of phosphoric acid to form the desired sodium phosphate salts.

I claim:

1. In a process for making a sodium polyphosphate salt from sodium chloride and phosphoric acid, the steps comprising: (a) contacting sodium chloride, ammonia and carbon dioxide in aqueous solution under such conditions as to form an aqueous solution of ammonium chloride and a solid precipitate of sodium bicarbonate; (b) reacting said sodium bicarbonate with sufficient phosphoric acid to produce carbon dioxide and to form a sodium phosphate composition having the same ratio of sodium to phosphorus as the aforesaid polyphosphate to be produced, and then heating said sodium phosphate composition at a temperature sufficient to drive off water and form the desired polyphosphate; (c) contacting said ammonium chloride solution with calcium hydroxide under conditions such as to precipitate a solid calcium chloride and release ammonia; and (d) recirculating said ammonia and said carbon dioxide to react with additional sodium chloride in aqueous solution to form additional ammonium chloride and sodium bicarbonate.

2. In a process for making sodium tripolyphosphate from sodium chloride and phosphoric acid, the steps comprising: (a) contacting sodium chloride, ammonia and carbon dioxide in aqueous solution under such conditions as to form an aqueous solution of ammonium chloride and a solid precipitate of sodium bicarbonate; (b) reacting said sodium bicarbonate with sufficient phosphoric acid to produce carbon dioxide and form a mixture of about 2 mole proportions of disodium orthophosphate and about 1 mole proportion of monosodium orthophosphate; (c) heating said mixture of disodium orthophosphate and monosodium orthophosphate at a temperature sufficient to drive off water and form sodium tripolyphosphate; (d) calcining calcium carbonate to produce calcium oxide and carbon dioxide; (e) reacting said calcium oxide with water to form calcium hydroxide; (f) reacting said calcium hydroxide with the aforesaid ammonium chloride under such conditions as to produce calcium chloride, ammonia and water; (g) recirculating at least a portion of the water from said reaction of calcium hydroxide and ammonium chloride to react with additional calcium oxide and form additional calcium hydroxide; and (h) recirculating the ammonia produced in said reaction of calcium hydroxide and ammonium chloride and a portion of carbon dioxide produced during said calcination of calcium carbonate and a portion of the carbon dioxide produced during said reaction of sodium bicarbonate and phosphoric acid to react with additional sodium chloride and water to form additional ammonium chloride and sodium bicarbonate.

References Cited in the file of this patent

UNITED STATES PATENTS

| | | |
|---|---|---|
| 1,699,093 | Carothers | Jan. 15, 1929 |
| 1,789,235 | Kipper | Jan. 13, 1931 |
| 2,390,400 | Taylor | Dec. 4, 1945 |

OTHER REFERENCES

Smith: "Inorganic Chemistry," page 688, Third Edition, Century Co., New York, 1921.